United States Patent [19]
Cline

[11] Patent Number: 5,436,429
[45] Date of Patent: Jul. 25, 1995

[54] FLEXIBLE ELECTRIC HEATING PAD FOR WRAPPING AROUND A BABY BOTTLE POWERED BY VEHICLE CIGARETTE LIGHTER PLUG

[76] Inventor: Mitchell T. Cline, 751 Salem Church Rd., Lincolnton, N.C. 28092

[21] Appl. No.: 99,470

[22] Filed: Jul. 30, 1993

[51] Int. Cl.⁶ .............................................. H05B 3/06
[52] U.S. Cl. .................... 219/202; 219/535; 219/528; 219/526; 219/549
[58] Field of Search .................. 219/202, 526–529, 219/549, 535, 211, 212; 126/204, 263; 128/402, 403; 607/96, 98, 99, 108–112, 114

[56] References Cited

U.S. PATENT DOCUMENTS

| | | | |
|---|---|---|---|
| 2,498,983 | 2/1950 | D'Albora | 219/527 |
| 2,617,916 | 11/1952 | Neidnig | 219/527 |
| 2,842,655 | 7/1958 | Schwebel | 219/527 |
| 3,079,486 | 2/1963 | Winchell | 219/535 |
| 3,084,241 | 4/1963 | Carrona | 219/211 |
| 3,407,818 | 10/1968 | Costanzo | 219/527 |
| 3,500,014 | 3/1970 | Longo | 219/211 |
| 3,710,075 | 1/1973 | Jablonowski | 219/527 |
| 3,968,348 | 7/1976 | Stanfield | 219/535 |
| 4,042,803 | 8/1977 | Bickford | 219/527 |
| 4,061,897 | 12/1977 | Thykeson | 219/527 |
| 4,065,660 | 12/1977 | Berard | 219/535 |
| 4,201,218 | 5/1980 | Feldman et al. | 219/527 |
| 4,279,255 | 7/1981 | Hoffman | 219/527 |
| 4,396,011 | 8/1983 | Mack et al. | 128/24.2 |
| 4,532,410 | 7/1985 | Wehmeyer | 219/529 |
| 4,788,417 | 11/1988 | Graflind | 219/528 |
| 4,825,048 | 4/1989 | Altmann et al. | 219/202 |
| 5,005,374 | 4/1991 | Spitler | 128/402 |
| 5,101,515 | 4/1992 | Holt et al. | 2/102 |
| 5,138,133 | 8/1992 | Sakurada et al. | 219/527 |

FOREIGN PATENT DOCUMENTS

| | | | |
|---|---|---|---|
| 1308795 | 10/1962 | France | 219/535 |
| 347478 | 1/1922 | Germany | 219/528 |
| 373748 | 10/1922 | Germany | 219/528 |
| 2181029 | 4/1987 | United Kingdom | 219/535 |

*Primary Examiner*—John A. Jeffery

[57] ABSTRACT

A flexible pad member includes a plurality of layers including a heat transmissive interior surface layer arranged to engage in a surrounding relationship a baby bottle, with the pad member arranged for ease of securement about the baby bottle in use. A vehicular cigarette lighter plug member is arranged to direct electrical energy into the heating wire grid positioned in adjacency into the interior web surface.

4 Claims, 4 Drawing Sheets

FLEXIBLE ELECTRIC HEATING PAD FOR WRAPPING AROUND A BABY BOTTLE POWERED BY VEHICLE CIGARETTE LIGHTER PLUG

BACKGROUND OF THE INVENTION

2. Field of the Invention

The field of invention relates to baby bottle structure, and more particularly pertains to a new and improved baby bottle heating pad arranged for the ease of heating a baby bottle during travel within a vehicle.

2. Description of the Prior Art

Heating pads of various types are employed in the prior art and exemplified by the U.S. Pat. Nos. 4,788,417; 4,396,011; and 4,061,897.

The instant invention attempts to overcome deficiencies of the prior art by providing for a heating pad structure arranged to accommodate heating of a baby bottle by permitting the pad to encompass a baby bottle in a surrounding relationship and in this respect, the present invention substantially fulfills this need.

SUMMARY OF THE INVENTION

In view of the foregoing disadvantages inherent in the known types of heating pad structure now present in the prior art, the present invention provides a baby bottle heating pad wherein the same employs a flexible heating pad member arranged for securement about a baby bottle to effect heating thereof. As such, the general purpose of the present invention, which will be described subsequently in greater detail, is to provide a new and improved baby bottle heating pad which has all the advantages of the prior art heating pad structure and none of the disadvantages.

To attain this, the present invention provides a flexible pad member including a plurality of layers including a heat transmissive interior surface layer arranged to engage in a surrounding relationship a baby bottle, with the pad member arranged for ease of securement about the baby bottle in use. A vehicular cigarette lighter plug member is arranged to direct electrical energy into the heating wire grid positioned in adjacency into the interior web surface.

My invention resides not in any one of these features per se, but rather in the particular combination of all of them herein disclosed and claimed and it is distinguished from the prior art in this particular combination of all of its structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved baby bottle heating pad which has all the advantages of the prior art heating pad structure and none of the disadvantages.

It is another object of the present invention to provide a new and improved baby bottle heating pad which may be easily and efficiently manufactured and marketed.

It is a further object of the present invention to provide a new and improved baby bottle heating pad which is of a durable and reliable construction.

An even further object of the present invention is to provide a new and improved baby bottle heating pad which is susceptible of a low cost of manufacture with regard to both materials and labor, and which accordingly is then susceptible of low prices of sale to the consuming public, thereby making such baby bottle heating pads economically available to the buying public.

Still yet another object of the present invention is to provide a new and improved baby bottle heating pad which provides in the apparatuses and methods of the prior art some of the advantages thereof, while simultaneously overcoming some of the disadvantages normally associated therewith.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
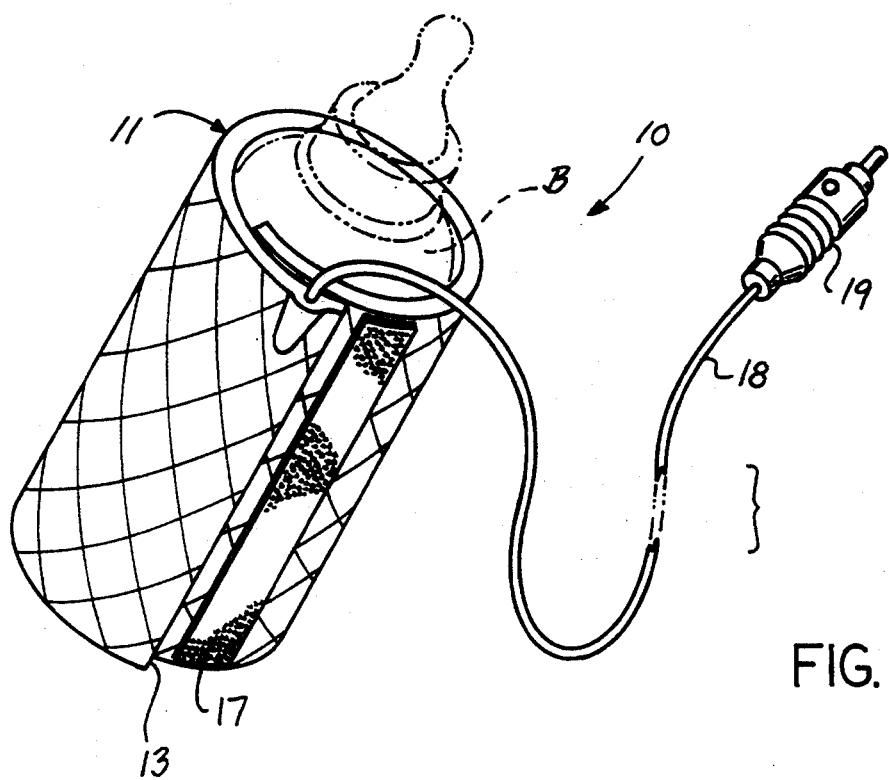
FIG. 1 is an isometric illustration of the invention.
Figure 2:
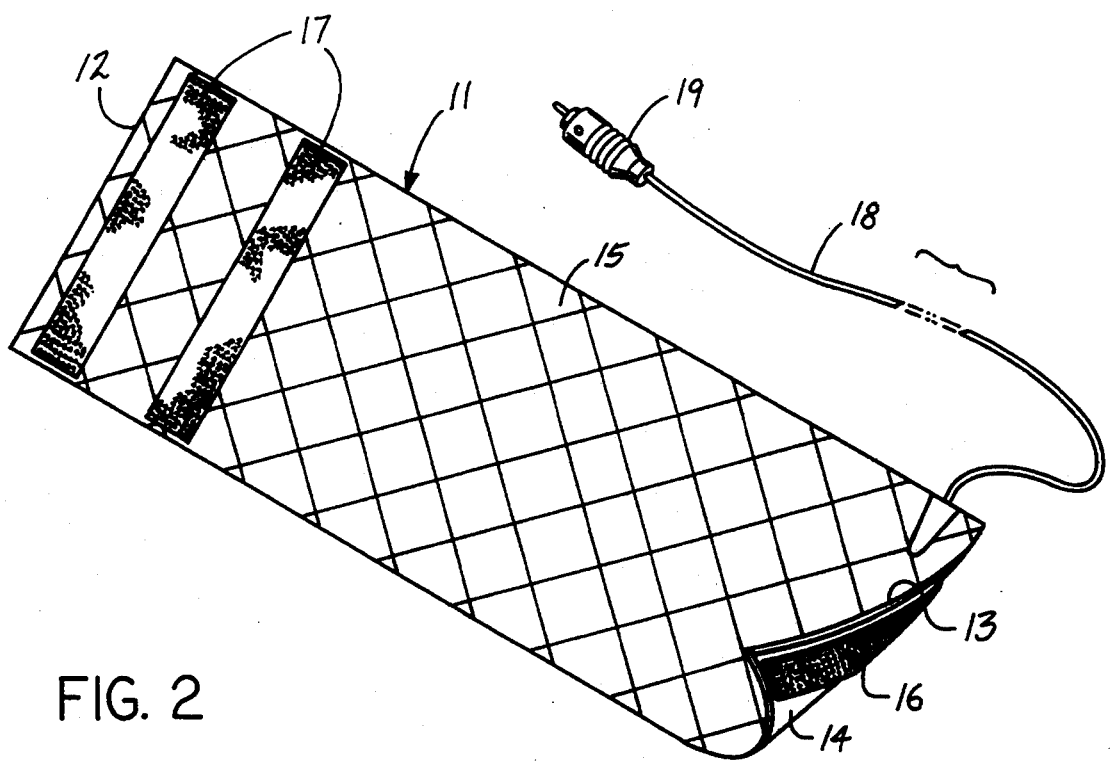
FIG. 2 is an isometric illustration of the invention in a substantially flattened configuration.
Figure 3:
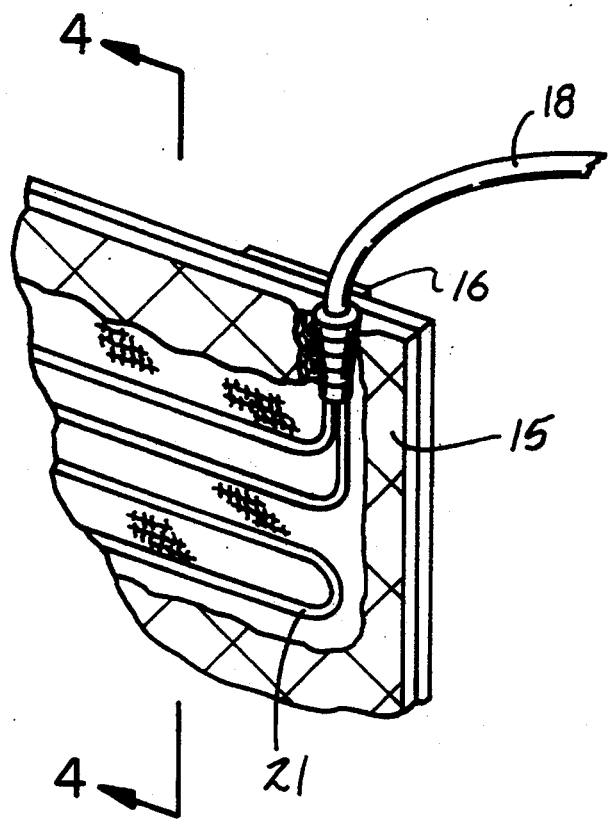
FIG. 3 is an enlarged isometric illustration, partially in section, to indicate the communication of the heating grid relative to the electrical connector cable.
Figure 4:
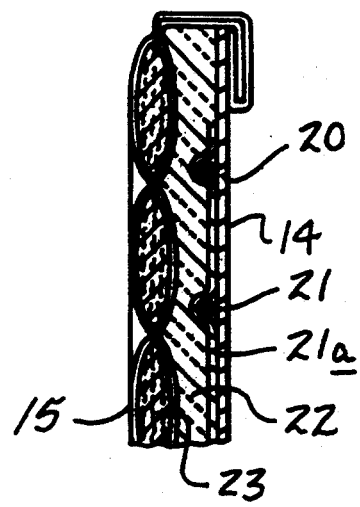
FIG. 4 is an cross-sectional view, taken along the lines 4—4 of FIG. 3 in the direction indicated by the arrows.
Figure 5:
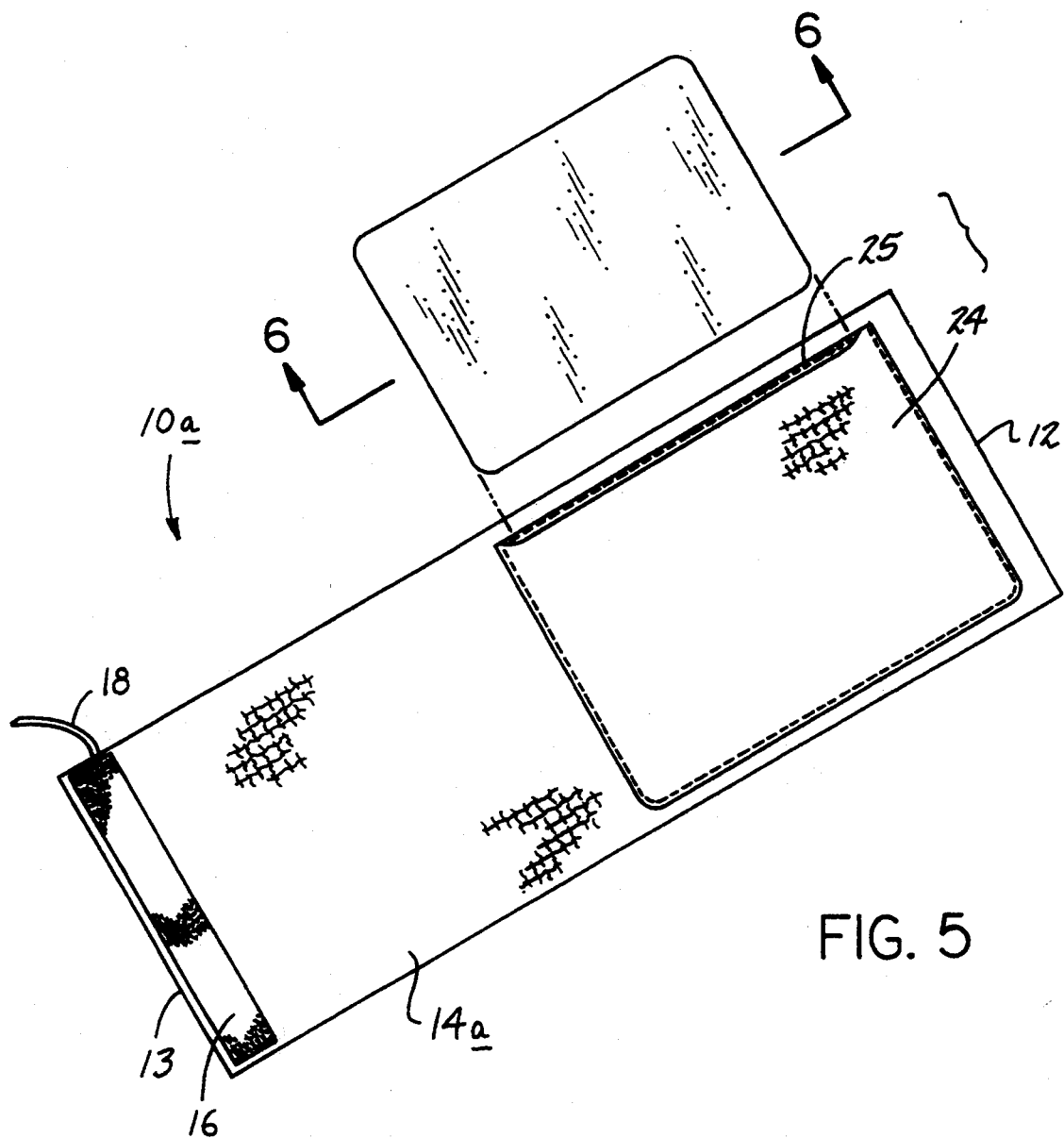
FIG. 5 is an isometric illustration of a modified pad structure.
Figure 6:
FIG. 6 is an cross-sectional view, taken along the lines 6—6 of FIG. 5 in the direction indicated by the arrows.

With reference now to the drawings, and in particular to FIGS. 1 to 8 thereof, a baby bottle heating pad embodying the principles and concepts of the present invention and generally designated by the reference numerals 10 and 10a will be described.

More specifically, the baby bottle heating pad 10 of the instant invention essentially comprises a flexible pad member 11 having a first end 12 spaced from a second end 13, including an interior surface 14 spaced from an exterior surface 15. A first hook and loop fastener strip 16 is mounted to the interior surface 14 in adjacency to the second end, with an individual or typically a plurality of second hook and loop fastener strip 17 in a parallel relationship relative to the first hook and loop fastener strip, with the second hook and loop fastener strip 17 mounted in adjacency to the first end 12. An electrical connector cable 18 is directed into the pad member 11 in electrical communication with an electrical resistance heating wire heating grid 21 mounted within tile flexible pad in adjacency to the interior surface 14 that is an outer surface of each heat transmissible web 20 (see FIG. 4) typically formed of a flexible metallic foil. An insulative first layer 22 is directed into the heating pad from the heating grid 21 and extends to a quilted second layer 23. A flexible, heat-resistant cover layer 21a extends over the heating grid 21 and between the first layer 22 and the web 20. As long as the material for the cover layer 21a is heat-resistant, the specific type of material for cover layer 21a is not critical. The quilted insulative second layer 23 is quilted to enhance manual grasping of the pad member 11 when secured about an infant nursing bottle "B", with the first hook and loop fastener strip 16 mounted to one of the second hook and loop fastener strips 17. A vehicular cigarette lighter 19 mounted to the electrical connector cable 18 at its free end is received within a conventional vehicular cigarette lighter socket to effect heating of the heating grid 21 and accordingly the contents of an infant nursing bottle "B".

Figure 7:
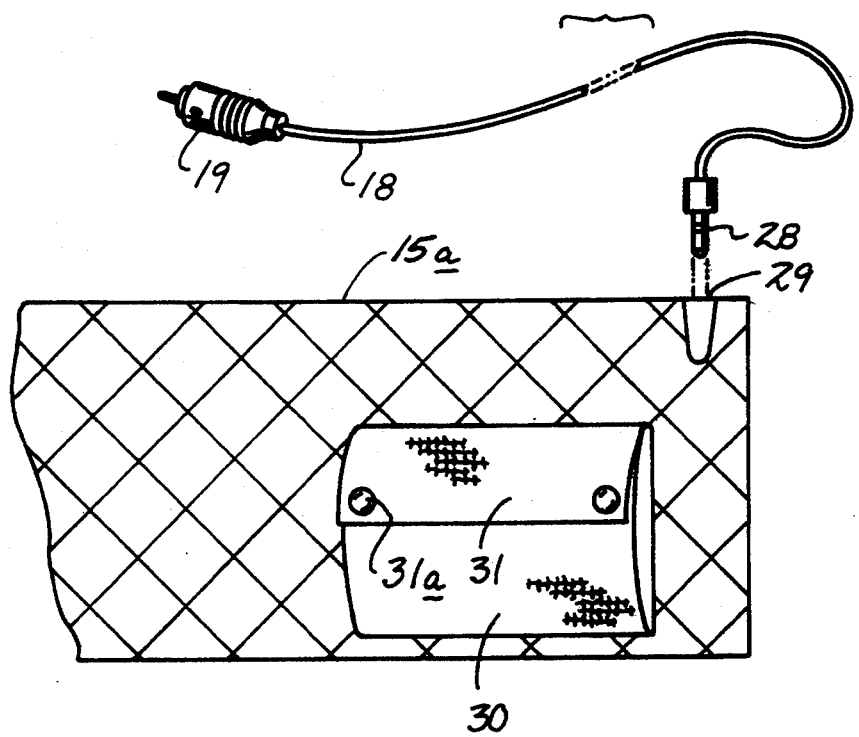
FIG. 7 is an isometric rear view of the structure employing an outer pocket.
Figure 8:
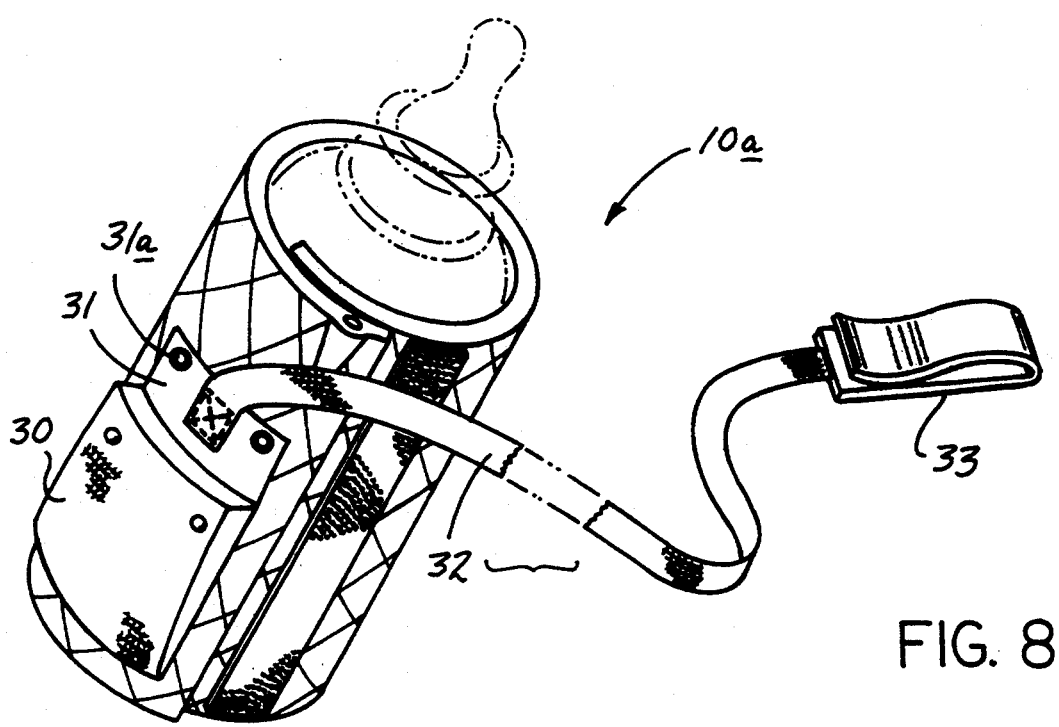
FIG. 8 is an isometric illustration of the outer pocket employing an anchoring tether strap.

The FIGS. 5-8 indicate a modified heating pad 10a, including a modified pad member 11a, including a modified interior surface 14a to further include a pocket 24 having a pocket cavity 25 complementarily receiving a flexible interior packet 26 to enclose a freezable gel 27, such that initial chilling and freezing of the gel contents of the packet permits initial prolonged storage of a food component within the bottle "B", such as milk, to preserve its freshness prior to a heating event, wherein the packet is removed during the heating event. The modified exterior surface 15a, as indicated in FIG. 7, includes an outer pocket cover flap 31 having snap connectors 31a to secure the cover flap 31 to the outer pocket 30, wherein an anchor tether strap 32 is provided within the outer pocket 30 secured at a first end of the tether strap 32 to the cover flap 31 at its interior surface, wherein a second end of the tether strap 32 includes a spring clip 33 for securement within an interior surface of an associated automotive vehicle, such as about the seat belt and the like, preventing undesired displacement of the heating pad 10a within the associated automotive vehicle.

As to the manner of usage and operation of the instant invention, the same should be apparent from the above disclosure, and accordingly no further discussion relative to the manner of usage and operation of the instant invention shall be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, failing within the scope of the invention.

What is claimed as being new and desired to be protected by LETTERS PATENT of the United States is as follows:

1. A baby bottle heating pad, comprising,
    a flexible pad member, including a first end spaced from a second end, and an outermost interior surface extending from the first end and the second end, and an outermost exterior surface coextensive with the interior surface and spaced therefrom,
    a first pad attachment member mounted to the interior surface adjacent the second end, and a second pad attachment member mounted to the exterior surface adjacent the first end, said first and second pad attachment members adapted to engage with each other thereby securely connecting said first and second pad attachment members together such that when the heating pad is wrapped around a baby bottle, the heating pad is securely fastened thereto,
    an electrical resistance wire heating grid directed coextensively through the flexible pad member in adjacency to the interior surface and coextensive therewith,
    an electrical connector cable in electrical communication with the heating grid,
    and
    a vehicular cigarette lighter plug mounted to the electrical connector cable for securement within a vehicular cigarette lighter socket,
    a heat transmissive web formed of a flexible metallic foil extending from the interior surface to the heating grid, and an insulative first layer extending from the heating grid coextensively within the heating pad and coextensive with the heat transmissive web, and a quilted second layer extending from the first layer to the exterior surface, wherein the quilted second layer is arranged for enhanced manual grasping when the pad member is secured about said baby bottle.

2. A heating pad as set forth in claim 1 wherein the first connector member includes a first hook and loop fastener strip oriented parallel to and adjacent the first end, and the second connector member includes at least one second hook and loop fastener strip mounted to the exterior surface adjacent the second end, with the second hook and loop fastener strip oriented parallel to the first hook and loop fastener strip.

3. A heating pad as set forth in claim 2 including an interior pocket mounted to the interior surface spaced from the first hook and loop fastener strip, and the interior pocket includes an interior pocket cavity, with a flexible packet arranged for complementary reception within the interior pocket cavity, and the flexible packet including a freezable gel disposed therein and directed coextensively throughout the flexible packet, said flexible packet arranged for reception within the interior pocket cavity.

4. A heating pad as set forth in claim 3 wherein the exterior surface includes an outer pocket spaced from the second hook and loop fastener strip, and the outer pocket includes a cover flap, the cover flap includes cover flap connectors arranged for securement of the cover flap to the outer pocket, and the cover flap including a cover flap interior surface and a cover flap exterior surface, the cover flap interior surface including an anchor tether strap, the anchor tether strap including a tether strap first end secured to the cover flap interior surface, and a tether strap second end having a spring clip member of a generally U-shaped configuration arranged for securement within a passenger compartment of an automotive vehicle.

* * * * *